(No Model.)

C. F. WILSON.
FISHING REEL.

No. 575,820.   Patented Jan. 26, 1897.

Witnesses:
George Barry Jr.
Edmund A. Strang

Inventor:
Charles F. Wilson
by attorneys
Brown & Seward

UNITED STATES PATENT OFFICE.

CHARLES F. WILSON, OF BROOKLYN, NEW YORK.

FISHING-REEL.

SPECIFICATION forming part of Letters Patent No. 575,820, dated January 26, 1897.

Application filed February 26, 1896. Serial No. 580,880. (No model.)

*To all whom it may concern:*

Be it known that I, CHARLES F. WILSON, of Brooklyn, in the county of Kings and State of New York, have invented a new and useful Improvement in Fishing-Reels, of which the following is a specification.

My invention relates to an improvement in fishing-reels in which provision is made for automatically applying a drag of any desired degree of resistance and at the same time leaving the winding mechanism unaffected and free to wind up the line without hindrance.

Figure 1:
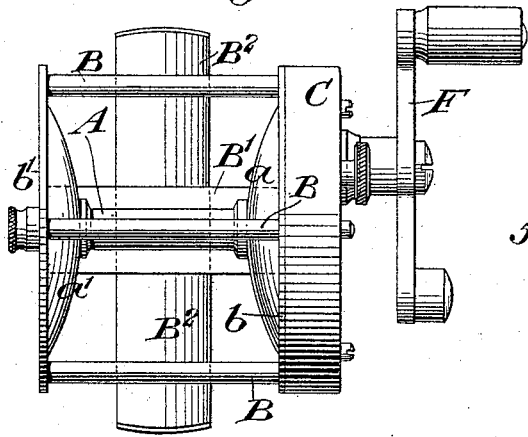
Figure 2:
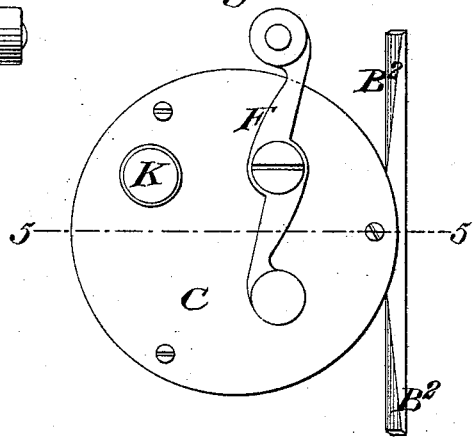
Figure 4:
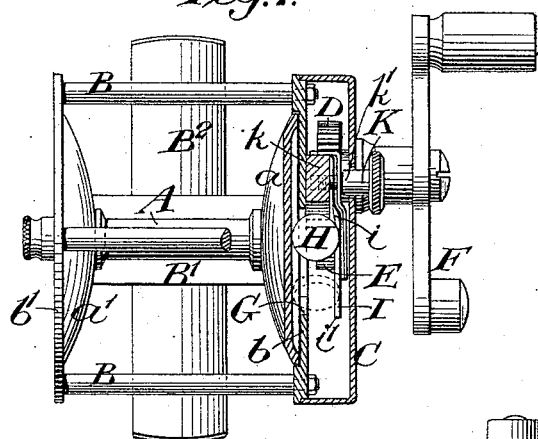
Figure 3:
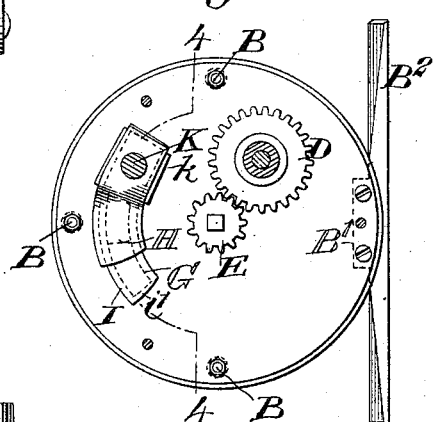
Figure 5:
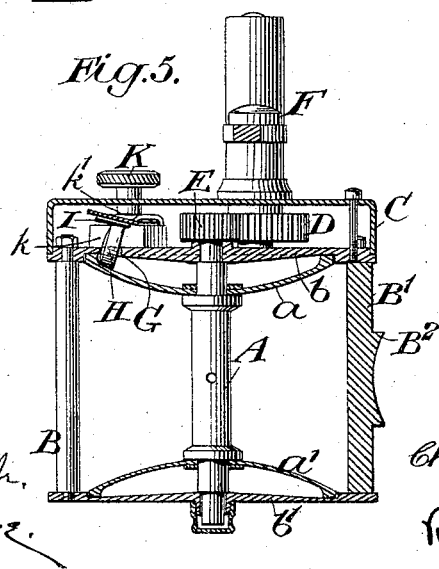

In the accompanying drawings, Figure 1 is a top plan view of the reel as it appears in use. Fig. 2 is an end view. Fig. 3 is an end view with the end cap and operating-crank removed. Fig. 4 is a top plan view, partly in section, along the line 4 4 of Fig. 3; and Fig. 5 is a longitudinal section along the plane of the line 5 5 of Fig. 2.

The spool on which the line is wound consists of a central spindle A, mounted in the end plates $b$ $b'$ of the reel-frame and provided with concavo-convex ends $a$ $a'$, fixed to rotate with the spindle A. The end plates $b$ $b'$ of the reel-frame are connected, as is usual, by the rods B at suitable intervals and by a bar B', to which the plate B² is fixed for attaching the reel to the pole, or the plate B² and bar B' may be formed integral. An end cap C is removably secured to one of the end plates, in the present instance to the end plate $b$, and between it and the end plate there is mounted a drive gear-wheel D, which intermeshes with a pinion E on the end of the spindle A. The operating-crank F is fixed to the axle of the gear-wheel D, through which and the pinion E the spool for winding the line is driven.

The automatic drag, to which my invention is particularly directed, is constructed and arranged as follows: In the end plate $b$ there is formed a curved slot G for the reception of a roller H, which bears against the outer face of the end $a$ of the spool and projects outwardly through the plate $b$, the walls of the curved slot G serving as guides to hold the roller in position against lateral displacement. Between the end cap C and the end plate $b$ there is located a spring I, which has a flat curved bearing against the roller H, tending when the roller is forced toward the fixed end of the spring at $i$ to wedge the roller between the spring and end of the spool and cause the spool to rotate with more or less difficulty, and when forced toward the free end of the spring at $i'$ to leave the spool perfectly free to rotate. The spring is adjusted toward and away from the end of the spool to increase or diminish the pressure of the roller against the spool by an adjusting-screw K, which extends through the end cap C into a screw-threaded socket in a piece $k$, fixed to the end plate $b$, the adjusting-screw being provided with a shoulder $k'$, which bears against the spring.

In operation, when the screw K is turned to put the drag on, the turning of the crank in the direction to wind up the line will force the roller H toward the free end of the spring I and hence leave the spool free to rotate; but the moment there is a pull on the line tending to unwind the line from the spool, as in playing a fish, the roller will at once be forced toward the fixed end of the spring and the drag will become effective.

The drag as thus constructed may be readily applied to reels now in common use with but little fitting and at small cost.

What I claim is—

1. The combination with a rotary spool and means for operating it, of a roller free to travel in a curved path along the end of the spool, and a spring adapted to press the roller toward the end of the spool, the said spring being so arranged that the rotary movement of the spool in one direction tends to wedge the roller between the spring and the spool and its motion in the opposite direction tends to set the roller free, substantially as set forth.

2. The combination with a rotary spool and means for operating it, of a roller free to travel in a curved path along the end of the spool, a spring adapted to press the roller toward the end of the spool and means for adjusting the spring toward and away from the end of the spool, substantially as set forth.

CHARLES F. WILSON.

Witnesses:
FREDK. HAYNES,
IRENE B. DECKER.